United States Patent [19]

Sekine et al.

[11] Patent Number: 4,806,950
[45] Date of Patent: Feb. 21, 1989

[54] IMAGE RECORDING APPARATUS FOR HEAT GENERATION TYPE

[75] Inventors: Kiyoshi Sekine, Koshigaya; Akio Ohtani, Hino, both of Japan

[73] Assignee: Kowa Company, Ltd., Nagoya, Japan

[21] Appl. No.: 63,073

[22] Filed: Jun. 17, 1987

[30] Foreign Application Priority Data

Jun. 23, 1986 [JP] Japan ................... 61-144957

[51] Int. Cl.$^4$ ........................... G01D 15/10
[52] U.S. Cl. ............... 346/76 PH; 358/298; 400/120
[58] Field of Search .......... 346/76 PH, 76 R; 219/216 PH, 216; 400/120, 120 PH; 358/296, 298; 364/518, 519

[56] References Cited

FOREIGN PATENT DOCUMENTS

11/1985 Japan ................... 400/120

Primary Examiner—E. A. Goldberg
Assistant Examiner—Huan H. Tran
Attorney, Agent, or Firm—Stevens, Davis, Miller & Mosher

[57] ABSTRACT

An image recording apparatus of a type using a heat sensitive record paper including a thermal head having a number of heat generating resistors aligned in a line extending in a width direction of the record paper which is fed under the thermal head at a constant speed, and a driving and controlling circuit for supplying heating currents to respective resistors in accordance with an image signal to be recorded. The driving and controlling circuit generates pre-heat pulses whose pulse width is changed in accordance with desired background level of an image to be formed, and record signals for reproducing gray levels of respective dots in the image. Each record signal is composed of a plurality of record pulses having different pulse widths corresponding to weights of digits of a binary image signal.

8 Claims, 3 Drawing Sheets

FIG_1
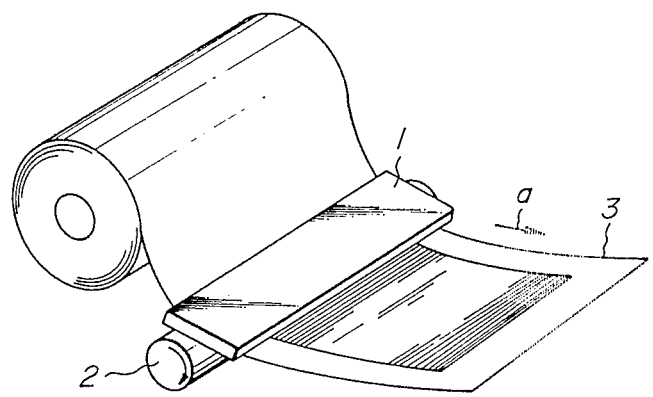
FIG_2
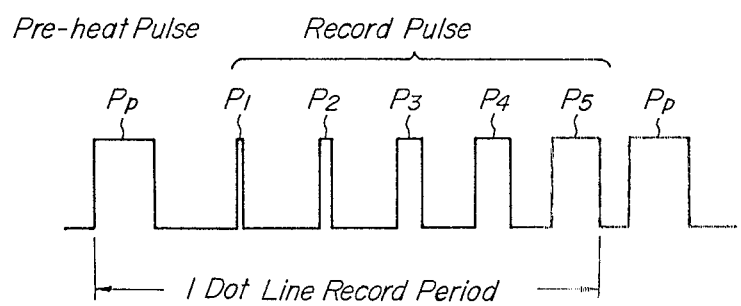

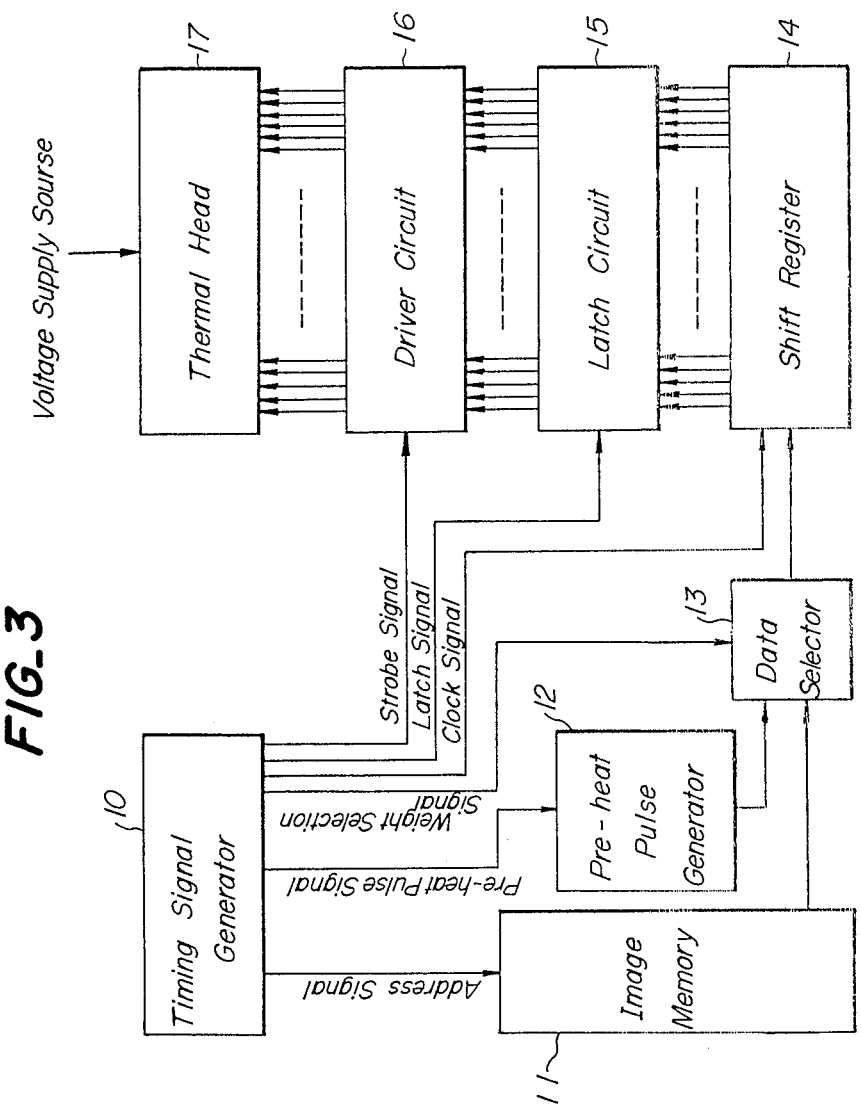

FIG_4
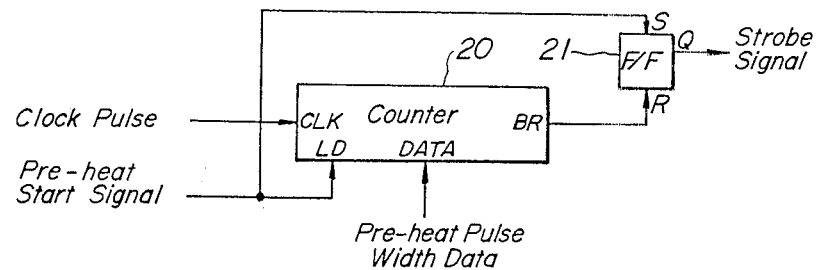
FIG_5
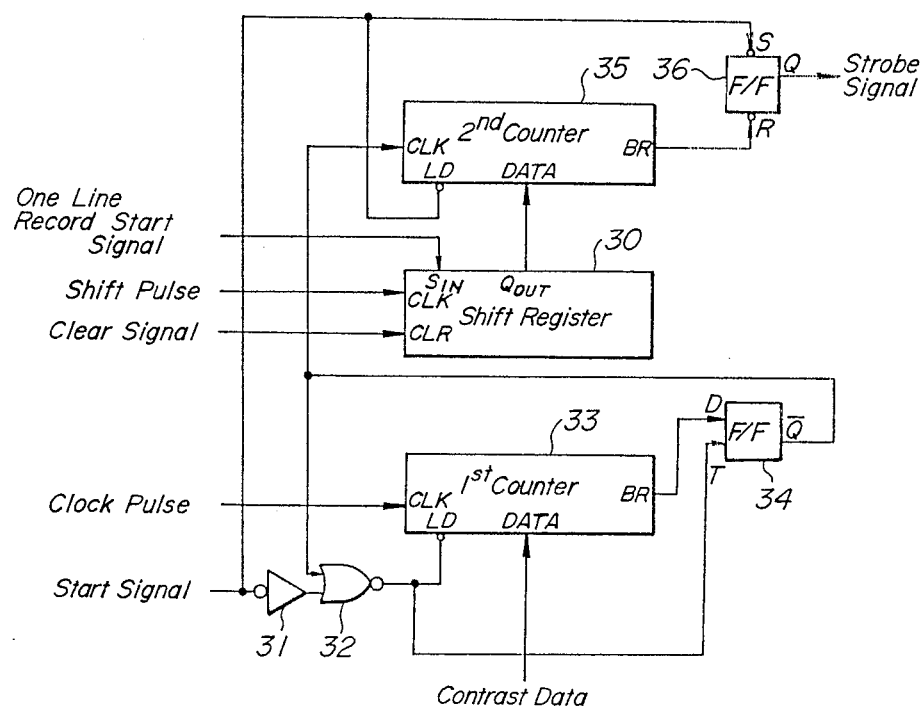

IMAGE RECORDING APPARATUS FOR HEAT GENERATION TYPE

BACKGROUND OF THE INVENTION

Field of the Invention and Related Art Statement

The present invention relates to an image recording appartus of heat generation type, and more particularly to an image recording apparatus of heat generation type in which a background level can be adjusted and a gray level can be reproduced in a precise manner by means of a simple circuit construction.

There has been practically used an image recording apparatus of heat generation type comprising a thermal head having a number of heat generating resistors arranged in a line and a driving circuit for supplying electric currents to respective resistors in accordance with an image to be recorded. In general, the heat generation type image recording apparatus may be classified into a heat sensitive type recording apparatus which utilizes a heat sensitive record paper having a substrate and a heat sensitive coloring material layer applied on the substrate, and a heat transfer type recording apparatus comprising a thermal head and an ink ribbon, an ink on the ribbon being thermally transferred onto a record paper. In these heat generation type recording apparatuses it is required to set or adjust a background level, i.e. a density of a background area as well as to reproduce the tone in a correct manner in accordance with an image to be recorded.

In the heat generation type image recording apparatus, there has been proposed to produce a number of record pulses having different pulse widths corresponding to gray levels of an image to be recorded and the record pulses thus formed are supplied to respective heat generating resistors of a thermal head. In such a known recording apparatus, the driving circuit has to produce various kinds of record pulses the number of which corresponds to that of the gray levels, so that the construction of the driving circuit becomes very complicated. Therefore, in the known device, there is provided only one driving circuit, and the record pulses produced by the common driving circuit are successively supplied to respective resistors via a switching circuit. Then, the recording speed becomes low.

It has been further proposed to change an amplitude of the heat generating current in accordance with gray levels. Such a method is called the area-tone method. It is also known to use the combination of the record pulse width modulation method and the area-tone method.

In the known recording apparatus, a pulse duration of each record pulse is determined by the preheating energy, the background level and the gray level. Therefore, when the background level is to be adjusted, it would be necessary to change the whole pulse width accordingly.

In the above mentioned known methods, if it is required to reproduce 32 gray levels, it is necessary to produce 32 different kinds of record pulses having different pulse widths and/or amplitudes, so that the driving circuit is liable to be complicated in construction. Further, if it is also required to change the background level, the widths of the record pulses have to be varied accordingly. For instance, if there must be provided five background levels, it would be necessary to produce 160(=32×5) record pulses having different pulse widths. Therefore, the driving circuit becomes further complicated. Therefore, if a number of heat generating resistors of the thermal head are energized parallelly by means of a number of driving circuits, the whole circuit would become extremely complicated. In order to mitigate the above drawback, it has been proposed to supply driving pulses to successive heat generating resistors serially from a single driving circuit. Then, a longer time is required to effect the recording of one dot line and the recording speed becomes lower.

Moreover, when an amount of generated heat is controlled by changing a pulse width of the record pulse, it is difficult to obtain stably the record image having good tonal property due to various factors such as a threshold value for coloring the heat sensitive record paper and a transferring threshold value for transferring an ink onto the record paper. Further, in the area-tone method, it is quite difficult to control a size of a coloring dot accurately and thus a resolution of the recorded image becomes worse.

SUMMARY OF THE INVENTION

The present invention has for its object to provide a novel and useful image recording apparatus of the heat generation type in which the gray level control and background level control can be effected independently in a precise manner.

It is another object of the invention to provide an image recording apparatus of heat generation type in which an image can be recorded at a high speed, while the construction of driving circuits can be made simple.

It is still another object of the invention to provide an image recording apparatus of heat generation type in which contrast of an image can be adjusted without affecting the reproduction of gray level.

According to the invention, an image recording apparatus of heat generation type comprises a thermal head having a plurality of heat generating resistors arranged in a line;

a means for feeding a record paper in a longitudinal direction;

a means for generating pre-heat pulses each of which determines a background level of an image to be recorded;

a means for generting record signals each of which determines a gray level of a respective dot in a dot line; and a means for supplying heating currents to respective heat generating resistors in a parallel manner in accordance with said pre-heat pulses and record signals.

According to a preferred embodiment of the image recording apparatus according to the invention, said means for generating the recording signals generates a combination of record pulses having different pulse widths in accordance with a gray level of a dot in the image to be recorded. When the gray level of the image is expressed by a binary signal, then the pulse widths may be weighted in accordance with the weights of digits of the binary signal. For example, 32 gray levels can be expressed by a combination of only five kinds of record pulses having different weights, so that the driving circuit can be made extremely simple.

DESCRIPTION OF THE DRAWINGS

FIG. 1 is a perspective view showing an outer appearance of an embodiment of the image recording apparatus according to the invention;

FIG. 2 is a signal waveform of a record signal composed of a pre-heat pulse and record pulses;

FIG. 3 is a block diagram illustrating an embodiment of a driving and controlling circuit;

FIG. 4 is a circuit diagram depicting the pre-heat pulse generating circuit; and FIG. 5 is a circuit diagram showing the record pulse generating circuit.

DESCRIPTION OF THE PREFERRED EMBODIMENTS

FIG. 1 is a perspective view showing an outer appearance of an embodiment of the image recording apparatus according to the invention. In the present embodiment, the recording apparatus is constructed as a heat sensitive recording apparatus. Between a thermal head 1 and a driving roller 2 is fed a heat sensitive record paper 3. The thermal head 1 comprises a number of heat generating resistors which are aligned in a line extending in a width direction of the record paper 3. The length of the resistor array is set equal to or slightly longer than the width of the record paper 3. Each resistors correspond to respective dots of an image to be formed, so that one dot line is formed simultaneously. The driving roller 2 is rotated continuously in a direction shown by an arrow to feed the record paper 3 in a direction shown by an arrow a. While the record paper 3 is fed, a recording of a single dot line is carried out. That is to say, during one dot line recording period, record signals are supplied to respective heat generating resistors in a parallel manner from a driving and controlling circuit. During a duty period of a record signal, a heating current is supplied to a resistor to generate thermal energy which is then supplied to the record paper 3, and the record paper is colored or blackened in accordance with an amount of the generated thermal energy. The colored density or gray level of the record paper 3 substantially corresponds to an amount of generated heat, it is possible to adjust the background level and to reproduce the gray level by changing the record signal in the manner which will be explained hereinbelow.

FIG. 2 is a signal waveform of an example of the record signal. In the present embodiment, the record pulse is composed of a pre-heat pulse $P_p$ and five record pulses $P_1 \sim P_5$ having different pulse widths. According to the invention, the pre-heat pulse $P_p$ has two functions, i.e. a first function for pre-heating the heat generating resistor and the record paper and a second function for determining a background level of an image to be recorded, i.e. a gray level of a background of the image. In general, the heat sensitive record paper has a threshold in a relation between an amount of supplied heat and a degree of coloring, so that after the record paper has been heated by the pre-heat pulse $P_p$ near the threshold level, when the record pulse having a duty corresponding to a gray level of the image signal is supplied, a desired gray level can be obtained stably and reliably. Particularly, in case of recording an image for use in a medical diagnosis, it is often required to set the background level to a desired value. In such a case, the duty of the pre-heat pulse $P_p$ is changed in accordance with the desired background level. In the present embodiment, the five record pulses $P_1 \sim P_5$ have different weights. That is to say, the first record pulse $P_1$ has a weight of $2^0 = 1$, the second record pulse $P_2$ has $2^1 = 2$, $P_3$ has $2^2 = 4$, $P_4$ has $2^3 = 8$ and the fifth pulse $P_5$ has a weight of $2^4 = 16$. Therefore, by suitably combining these record pulses having different weights, it is possible to reproduce $2^5 = 32$ gray levels. For this purpose, the image signal is represented by a binary digital signal of five bits. That is to say, when a dot has the background level, an image signal corresponding to this dot is represented by a binary number "00000", and then there is produced no record pulse. Contrary to this, when a dot has to be recorded with the highest gray level ($32^{th}$ gray level), its image signal is expressed by a binary number "11111" and all the five record pulses $P_1 \sim P_5$ are generated for the relevant dot. If a dot has to be recorded with the sixth gray level, its binary signal is represented by "00101" and there is produced two record pulses $P_1$ and $P_3$. In this manner, it is possible to reproduce 32 gray levels by 32 combinations of five record pulses $P_1 \sim P_5$ having different pulse widths corresponding to different weights.

FIG. 3 is a block diagram showing an embodiment of the driving and controlling circuit of the image recording apparatus according to the invention. The driving and controlling circuit comprises a timing signal generating circuit 10 which produces various control signals such as start signals, strobe signals, latch signals and clock pulses. The image signal representing gray levels at respective dots in an image to be recorded is stored in an image memory 11 as a five bit binary signal.

At first, an operator enters a pre-heat pulse width preset signal and a record pulse width preset signal to the timing signal generating circuit 10. Upon effecting the one dot line recording, a pre-heat pulse is supplied from the timing signal generating circuit 10 to a pre-heat pulse generating circuit 12 to generate pre-heat pulses for all dots in one dot line. These pre-heat pulses are transferred via a data selector 13 to a shift register 14 under the control of clock pulses supplied from the timing signal generating circuit 10. Then, the timing signal generating circuit 10 supplies a latch signal to a latch circuit 15 and the pre-heat pulses stored in the shift register 14 are latched in the latch circuit 15. Then, the timing signal generating circuit 10 supplies a strobe signal having a given duty to a driver circuit 16 to operate the drive circuit such that heat generating currents are supplied to respective heat generating resistors of a thermal head 17 for a time period equal to the duty of the strobe signal. The driver circuit 16 comprises a number of switching elements each being connected between one terminals of respective resistors in the thermal head 17 and the ground, and the other ends of respective resistors being commonly connected to a voltage supply source. During this pre-heating operation, the least significant bits of "1" having the weight of $2^0 = 1$ are selected as the first record pulse $P_1$ by the data selector 13 from the binary image signals of one dot line stored in the image memory 11 and are transferred to the shift register 14. After the pre-heating has been finished, the first record pulses $P_1$ in the shift register 14 is latched in the latch circuit 15 by means of a next latch signal. Then, the driver circuit 16 is driven for the duty of a second strobe signal which duty is equal to the pulse width of the first record pulse $P_1$ to heat one or more resistors of the thermal head 17 for the pulse width of the first record pulse $P_1$. During the recording operation by the first record pulse $P_1$, one or more second record pulses $P_2$ are transferred to the shift register 14 and then one or more resistors are heated from the pulse width of the second record pulse $P_2$ under the control of a strobe pulse supplied from the timing signal generating circuit 10. In this manner, given resistors in the thermal head 17 are selectively heated for the pulse widths of the record pulses $P_1 \sim P_5$ to finish one line recording. During the above recording process, the record paper has been fed by one dot line width and the recording for a next dot line will be performed in a similar manner.

As explained above, in the present embodiment, it is possible to reproduce 32 gray levels by using only five kinds of record pulses $P_1 \sim P_5$, and thus the construction of the driving and controlling circuit can be made very simple and the recording speed can be increased materially.

FIG. 4 is a circuit diagram of a circuit for generating a strobe signal for the pre-heat pulse $P_p$. According to the invention, the pulse width of the pre-heat pulse $P_p$ is adjusted in accordance with the desired background level by changing a duty of the strobe signal supplied from a strobe signal generating circuit provided in the driving and controlling circuit. The strobe signal generating circuit comprises a counter 20 and a flip-flop 21. Pre-heat pulse width data entered by the operator with the aid of the input device (not shown) is supplied to the counter 20 as a preset count value. Upon recording the single dot line, a pre-heat pulse start signal is supplied to a load input LD of the counter 20 and a set input S of the flip-flop 21. Then, the preset value is entered in the counter 20 via a data input DATA and the flip-flop circuit is set to initiate the strobe signal. In response to the start signal, the counter 20 starts to count clock pulses up to the preset count value corresponding to the pre-heat pulse width data. When the counter 20 has counted clock pulses up to the preset value, it supplies an output signal to a reset input R of the flip-flop 21 to reset the flip-flop. since the flip-flop 21 remains in the set state as lond as the counter 20 counts the clock pulses, the flip-flop 21 produces the strobe signal having a duty corresponding to the pre-heat pulse width data.

FIG. 5 is a circuit diagram showing an embodiment of a circuit for generating strobe signals defining the pulse widths of the record pulses $P_1 \sim P_5$. Also in the present embodiment, these pulse widths can be prolonged and shortened in accordance with a desired contrast. In accordance with the nature of the image to be recorded, it is often required to change the contrast of the recorded image. To this end, in the present embodiment, the widths of record pulses can be changed without changing a ratio of the weights of the record pulses $P_1 \sim P_5$.

Upon recording a single dot line, a record start signal is supplied to a serial input $S_{IN}$ of a shift register 30. Upon generating five record pulses successively, start signals are supplied via inverter 31 and NOR circuit 32 to a load input LD of a first counter 33 and a set input S of a first flip-flop 34 and directly to a load input LD of a second counter 35 and a set input S of a second flip-flop 36. The operator enters desired contrast data to a data input DATA of the first counter 33. When the start signal is supplied, the first and second flip-flops 34 and 36 are set, and the contrast data is loaded in the first counter 33 as a preset count value. Then, the first counter 33 starts to count clock pulses up to the preset value. When the first counter 33 has counted the clock pulses up to the preset value, it supplies an output signal to the first flip-flop 34 to reset it. Then, an output signal of the first flip-flop 34 is supplied via the NOR circuit 32 to the first counter 33 as the load signal, and the first counter 33 starts again to count clock pulses. In this manner, the first counter 33 effects the frequency division in accordance with the contrast data. The output signal of the first flip-flop 34 is also supplied to a clock input CLK of the second conuter 35. A parallel outputs $Q_{OUT}$ of the shift register 30 is connected to data input DATA of the second counter 35. Every time the start signal is supplied, the content of the shift register 30 is loaded into the second counter 35 as a preset value, and the second counter starts to count clock pulses up to the preset count value. After the second counter has counted clock pulses up to the preset value, it supplies an output signal to the second flip-flop 36 to reset it. An output signal of the second flip-flop 36 is supplied as a strobe signal having a desired duty. In this manner, the first record pulse $P_1$ has a pulse width T corresponding to a time period during which the first counter 33 counts the clock pulses up to the preset value corresponding to the entered contrast data. After the first record pulse $P_1$ has been supplied, the record start signal stored in the shift register 30 is shifted by one bit by means of a shift pulse, and a start signal for the second record pulse $P_2$ is supplied to set the first and second flip-flops 34 and 36. At the same time, the first conuter 33 starts to count clock pulses up to the preset value corresponding to the entered contrast data. In case of forming the second record pulse $P_2$, since the parallel output signal of the shift register 30 has been shifted by one bit, the second flip-flop 36 is reset when a second output signal is supplied from the first flip-flop 34. In this manner, the strobe signal having a duty which is twice the duty T of the first record pulse is supplied from the second flip-flop 36. In the manner explained above, strobe pulses having duties 4T, 8T and 16T, respectively are successively produced as third, fourth and fifth strobe signals corresponding to the record pulses $P_3$, $P_4$ and $P_5$, respectively. In this case, the duty T of the first strobe signal is defined by the contrast data, so that the contrast of the recorded image can be adjusted or controlled without changing the weight ratio of the record pulses $P_1 \sim P_5$.

The present invention is not limited to the embodiment explained above, but many modifications and alternations may be conceived by those skilled in the art within the scope of the invention. For instance, in the above embodiment, the image recording apparatus is constructed as the heat sensitive recording apparatus, but may be formed as the heat transfer type recording apparatus. Further, the pre-heat pulse generating circuit and record pulse generating circuit may be constructed in various ways.

According to the invention, each heat generating resistor is energized by the pre-heat pulse having a pulse width defining the background level and the record signal composed of a plurality of record pulses having different pulse widths, so that the background level can be adjusted and the gray level can be reproduced in a precise and stable manner. Further the driving and controlling circuit can be made very simple, because the number of pulses to be generated can be decreased, without reducing the number of gray levels to be reproduced.

When the record pulses have different pulse widths corresponding to weights of digits of the binary image signal, the driving and controlling circuit can be made further simpler.

Moreover, the contrast of the image can be adjusted by changing the pulse widths of the record pulses without changing the weight ratio of the record pulses. Therefore, the contrast can be adjusted without affecting the tonal reproduction.

What is claimed is:

1. A heat generating image recording apparatus comprising;
    a thermal head having a plurality of heat generating resistors arranged in a line extending in a width direction of a record medium, said resistors recording respective image dots in a dot line on said recording medium;
    a means for feeding the record medium in a direction perpendicular to the width direction of the record paper past said head;
    a means for generating pre-heat pulses, said pre-heat pulses having pulse characteristics which determine a background level of an image to be recorded;
    a means for generating a record signal for each of said resistors, each of said record signals determining a gray level of a respective image dot in a dot line, a plurality of the record signals being produced corresponding to each dot line in accordance with an image signal to be recorded; and
    a means for supplying heating currents to respective heat generating resistors in a parallel manner for recording image dots in a dot line, each said image dot being recorded in accordance with a combination of a pre-heat pulse and a record signal.

2. An apparatus according to claim 1, wherein each said record signal is composed of at least one of a plurality of record pulses having different pulse widths.

3. An apparatus according to claim 2, wherein said pulse widths of record pulses have different weights corresponding to weights of respective digits of a binary signal representing a gray level of an associated image dot.

4. An apparatus according to claim 3, further comprising means for changing contrast of an image by changing the pulse widths of record pulses, while a ratio of the weights of the record pulse width remain constant.

5. An apparatus according to claim 4, wherein said means for supplying heating currents comprises a shift register for storing pre-heat pulses and record pulses for each resistor, a latch circuit for latching the pre-heat pulses and record pulses stored in the shift register, and a driver circuit including a number of switching elements each connected to respective heat generating resistors in the thermal head, said switching elements being driven by output signals of the latch circuit.

6. An apparatus according to claim 5, wherein said means for generating pre-heat pulses comprises a counter for counting clock pulses, a means for entering pre-heat pulse width data defining the background level into said counter as a preset count value, and a flip-flop which is set by a start signal and reset by an output signal of the counter, whereby said counter starts to count clock pulses up to said preset count value and said flip-flop generates a strobe signal corresponding to the pre-heat pulse.

7. An apparatus according to claim 5, wherein said record signal generating means comprises a first counter for counting clock pulses, means for entering contrast data in the first counter as a preset count value, said first counter counting clock pulses up to the preset count value, a first flip-flop which is set by a count start signal and reset by an output signal from the first counter, a second counter for counting output pulses from the first flip-flop, a shift register for shifting a record start signal by shift pulses corresponding to digits of the binary signal, means for entering a content of the shift register in the second counter as a preset count value, and a second flip-flop which is set by the start signal and reset by an output signal from the second counter to produce strobe signals each corresponding to respective record pulses.

8. A heat generation image recording apparatus comprising:
    a thermal head having a plurality of heat generating resistors arranged in a line extending in a width direction of a record medium, said resistors recording respective image dots in a dot line on said recording medium;
    a means for feeding the record medium in a direction perpendicular to the width direction of the record paper past said head;
    a means for generating a record signal for each of said resistors, each of said record signals being composed of one, or a combination of more than one, of a plurality of record pulses the number of which is equal to the number of digits composing a binary number representing a gray level of a dot to be recorded and whose pulse widths are related to binary weights of said digits; and
    a means for supplying to respective heat generating resistors heating currents in a parallel manner in accordance with an associated record signal.

* * * * *